(12) United States Patent
Tang et al.

(10) Patent No.: US 11,102,664 B2
(45) Date of Patent: Aug. 24, 2021

(54) SON COORDINATION UNDER THE OCCURRENCE OF AN ANOMALY

(71) Applicant: Nokia Solutions and Networks Oy, Espoo (FI)

(72) Inventors: Haitao Tang, Espoo (FI); Kaj Peter Stenberg, Sundsberg (FI)

(73) Assignee: Nokia Solutions and Networks Oy, Espoo (FI)

( * ) Notice: Subject to any disclaimer, the term of this patent is extended or adjusted under 35 U.S.C. 154(b) by 59 days.

(21) Appl. No.: 16/463,978

(22) PCT Filed: Nov. 24, 2016

(86) PCT No.: PCT/EP2016/078617
§ 371 (c)(1),
(2) Date: May 24, 2019

(87) PCT Pub. No.: WO2018/095527
PCT Pub. Date: May 31, 2018

(65) Prior Publication Data
US 2020/0389801 A1    Dec. 10, 2020

(51) Int. Cl.
*H04W 24/02* (2009.01)
*H04W 84/18* (2009.01)

(52) U.S. Cl.
CPC ............ *H04W 24/02* (2013.01); *H04W 84/18* (2013.01)

(58) Field of Classification Search
CPC .................................................... H04W 24/02
See application file for complete search history.

(56) References Cited

FOREIGN PATENT DOCUMENTS

| WO | WO 2012110078 | 8/2012 |
|----|---------------|--------|
| WO | WO 2012143055 | 10/2012 |
| WO | WO 2014047835 | 4/2014 |
| WO | WO 2014090307 | 6/2014 |
| WO | WO 2015165525 | 5/2015 |
| WO | 2015169333 A1 | 11/2015 |
| WO | WO 2016029969 | 3/2016 |
| WO | WO 2016110330 | 7/2016 |
| WO | WO 2016146192 | 9/2016 |

OTHER PUBLICATIONS

Office Action dated Jul. 27, 2020 for Korean Patent Application No. 10-2019-7018048, 10 pages.
Office Action dated Apr. 29, 2020 for European Application No. 16 805 342.9, 6 pages.

*Primary Examiner* — Ronald B Abelson
(74) *Attorney, Agent, or Firm* — Tong, Rea, Bentley & Kim, LLC (57) ABSTRACT

It is provided a method, comprising determining a range of an attribute of an anomaly; checking if the range of the attribute of the anomaly overlaps with a range of a related attribute of a coordinated function instance; triggering to execute a coordination action on the coordinated function instance if the range of the attribute of the anomaly overlaps with the range of the related attribute of the coordinated function instance, wherein the related attribute of the coordinated function instance is the same as the attribute of the anomaly, or the related attribute of the coordinated function instance and the attribute of the anomaly correspond to each other.

17 Claims, 4 Drawing Sheets

SON COORDINATION UNDER THE OCCURRENCE OF AN ANOMALY

CROSS REFERENCE TO RELATED APPLICATIONS

This application claims priority to the PCT International Application No. PCT/EP2016/078617 having an international filing date of Nov. 24, 2016 and entitled "SON Coordination Under the Occurrence of an Anomaly," which is hereby incorporated by reference in its entirety.

FIELD OF THE INVENTION

The present invention relates to an apparatus, a method, and a computer program product related to a communication network. More particularly, the present invention relates to an apparatus, a method, and a computer program product of a self-organizing network in which an anomaly may occur.

ABBREVIATIONS

3GPP Third Generation Partnership Project
4G 4th Generation
5G 5th Generation
CCO Coverage and Capacity Optimization
CDMA Code Division Multiple Access
CM Configuration Management
EDGE Enhanced Datarate for GSM Evolution
EMS Energy Saving Management
GSM Global System for Mobile Communication
ID Identifier
KPI Key Performance Indicator
LTE Long Term Evolution
LTE-A LTE-Advanced
MO Managed Object
MOID Managed Object ID
NGMN Next Generation Mobile Networks (Alliance)
OSS Operation Support System
SCF SON Coordination Function
SDL Specification and Description Language
SON Self-Organizing Network
UMTS Universal Mobile Telecommunications System
UTRAN UMTS Terrestrial Radio Access Network

BACKGROUND OF THE INVENTION

The evolvement of communication technology, especially the wireless communication technology, has increased the complexity of networks and the amount of network nodes, thereby increasing operation and maintenance tasks i.e. management tasks. To automate at least some of the tasks a concept called a self-organizing network (SON) is introduced by NGMN and 3GPP to be used first in LTE access networks, and later on in other networks, both in access and core networks. A self-organizing network is capable to self-configure and continuously self-optimize itself in response to network and traffic changes. Some SON functions may be used for automatically performing management actions, such as fault, configuration, accounting, performance and security management. Examples of SON functions include mobility load balancing, handover optimization, coverage and capacity optimization, cell outage management, and mobility robustness optimization.

In such a network, the network and/or a network node alters automatically, preferably without human involvement, its configuration parameters, such as transmission and/or reception parameters, by means of different self-organizing network functions. Since monitored network behavior triggers execution of one or more self-organizing function instances, it may happen that several independent self-organizing function instances are active concurrently in the same network area with different targets. Thus, it would be useful to coordinate the self-organizing network functions.

The data repository (e.g. database) of a SON function manager software application may store at least one of the following pieces of information for each of one or more SON functions: an input impact time, an input scope, information elements of the input scope, an objective, an output impact time, an impact area, and information elements of the impact area.

An instance of a SON function (also referred to as a SON function instance) may be defined as a run-time process that instantiates a SON function in a network environment; an input impact time may be defined as the time period that at least one information element input to a SON function instance would be impacted, by at least one information element that is output by another SON function instance; an input scope may be defined as at least one information element that a SON function instance collects in order to execute; an information element may be defined as a piece of data; an information element is a piece of data about one of: a network element or multiple network elements (such as for example a user equipment (UE), a cell, a cell pair, cell neighbors, a cell cluster), a sub-network or even the entire network. Example information elements are pieces of data about: a UE's behavior, a cell's characteristics, a home subscriber server (HSS)/home location register (HLR) entry, and an operations support system (OSS) record. An objective of a SON function instance may be defined as a goal of the SON function instance. Example objectives of SON function instances are: increase capacity of a cell and minimize handovers of signals from one cell to another.

An output impact time may be defined as the time period that at least one information element output by a SON function instance would impact: at least one information element input to another SON function instance or at least one information element output by the other SON function instance. An impact area may be defined as at least one information element output by a SON function instance and any other information element(s) affected by the information element(s) output by the SON function instance. An example of how an information element output by a SON function instance could affect other information elements is as follows. A SON function instance changes the power parameter of cell 1 and this results in a coverage change of cell 1. The resulted coverage change of cell 1 affects information elements of cell 2, a neighbor of cell 1. In this example, both the power parameter of cell 1 and the affected information elements of cell 2 make up the impact area.

SON coordination function has provided a solution to prevent potential conflicts between SON functions/other functions running in networks and their OSS. It helps to smoothly operate the networks with concurrently running SON functions and other functions (including a manual configuration operation from human operator). A potential conflict may be defined as a scenario in which at least one information element output by a first instance of a SON function would make at least a (potentially substantial) impact on at least one information element collected, a decision making and/or at least one information element output by a second instance of a same or another SON function. Examples of such substantial impact are: the first instance affecting the originally intended operation of the second instance and lowering the corresponding performance of the second instance; the first instance distorting the input to the second instance, the first instance blocking the execution of the second instance, the first instance canceling the intended action of the second instance, the first instance canceling the change made by the second instance, the first instance deleting or diminishing the performance gain achievable by the second instance, the first instance competing with the second instance to solve the problem that could be solved by the second instance alone.

Furthermore, a potential conflict is directional from one instance to another. In other words, when a first instance conflicts with a second instance in a particular way, this does not necessarily mean that the second instance conflicts with the first instance in the same way.

A SON Coordination Function is a special SON function that controls actions and possibly the activations of some or all of the SON functions and non-SON functions under its jurisdiction in a specific system operation environment, so that the system can achieve better system performance than what could be achieved if there were no such coordination function in place; The control can enable a SON interaction/impacts that would improve system performance and reduce or even disable a SON interaction/impacts that would damage system performance (i.e., a SON conflict) through its coordination action such as (1) to approve, reject, reschedule, or modify an action requested by a SON function, (2) to enable/create a SON interaction, (3) to instruct a new action, and (4) to enable the supreme control of the SON system by its human operator. A part of the SON coordination function may even be implicitly embedded inside a group of co-designed SON functions sometimes.

The SON coordination function may detect potential conflicts as overlaps. Examples of overlaps which may indicate a potential conflict are (see reference [1] for further details):

- overlap of an input impact time of one (SON) function instance with an input impact time of another (SON) function instance;
- overlap of an input scope of one (SON) function instance with an input scope of another (SON) function instance;
- overlap of an output impact time of one (SON) function instance with an input impact time of another (SON) function instance;
- overlap of an impact area of one (SON) function instance with an input scope of another (SON) function instance;
- overlap of an output impact time of one (SON) function instance with an output impact time of another (SON) function instance;
- overlap of an impact area of one (SON) function instance with an impact area of another (SON) function instance.

Also, a conflict may be present if objectives of two SON instances are substantially the same or contradictory to each other.

The example conditions (overlaps) for a potential conflict may be logically combined, e.g. by AND, OR, and/or NOT.

REFERENCES

[1] "Method to detect an inter-function conflict based on the analysis of their input and output": WO 2015/169333 A1;
[2] "Method of providing system-wide consistent control for uncoordinated SON functions": WO 2016/110330 A1;
[3] "Method for cross-vendor domain coordination in self-organized networks": WO 2012/110078 A1;
[4] "Multi-vendor domain coordination of SON functions using priority-based, temporary locking of entities": WO 2012/143055 A1;
[5] "Control of SON Coordination": WO 2014/047835 A1;
[6] "Method of network operation based on abstracted network properties": WO 2014/090307 A1.

SUMMARY OF THE INVENTION

It is an object of the present invention to improve the prior art.

According to a first aspect of the invention, there is provided an apparatus, comprising at least one processor, at least one memory including computer program code, and the at least one processor, with the at least one memory and the computer program code, being arranged to cause the apparatus to at least perform at least determining a range of an attribute of an anomaly; checking if the range of the attribute of the anomaly overlaps with a range of a related attribute of a coordinated function instance; triggering to execute a coordination action on the coordinated function instance if the range of the attribute of the anomaly overlaps with the range of the related attribute of the coordinated function instance, wherein the related attribute of the coordinated function instance is the same as the attribute of the anomaly, or the related attribute of the coordinated function instance and the attribute of the anomaly correspond to each other as input attribute and output attribute, respectively, or the related attribute of the coordinated function instance and the attribute of the anomaly correspond to each other as output attribute and input attribute, respectively.

The at least one memory and the computer program code may be arranged to cause the apparatus to further perform inhibiting the triggering to execute of the coordination action on the coordinated function instance if the range of the attribute of the anomaly does not overlap with the range of the related attribute of the coordinated function instance.

If the attribute of the anomaly is one of an input scope of the anomaly and an impact area of the anomaly, the related attribute may be one of an input scope of the coordinated function instance and an impact area of the coordinated function instance; and if the attribute of the anomaly is one of an input impact time of the anomaly and an output impact time of the anomaly, the related attribute may be one of an input impact time of the coordinated function instance and an output impact time of the coordinated function instance.

The at least one memory and the computer program code may be arranged to cause the apparatus to further perform creating an anomaly function instance based on the attribute of the anomaly; wherein the checking and the triggering may be performed by coordinating the coordinated function instance and the anomaly function instance by a coordination function.

The at least one memory and the computer program code may be arranged to cause the apparatus to further perform monitoring if a resolution message is received, wherein the resolution message indicates that the anomaly is successfully troubleshooted; deleting the anomaly function instance if the resolution message is received.

The coordination action may comprise at least one of
approving a first action requested by the coordinated function instance,
rejecting a second action requested by the coordinated function instance, rescheduling a third action requested by the coordinated function instance, modifying a fourth action requested by the coordinated function instance, enabling/creating an interaction of the coordinated function instance and another function, instructing a new fifth action, and enabling a supreme control of the coordinated function instance by a human operator.

The at least one memory and the computer program code may be arranged to cause the apparatus to further perform determining if the range of the attribute of a prior performed action of a function instance overlaps with the range of the attribute of the anomaly function instance, wherein the coordination action may comprise at least one of instructing a new sixth action for undoing the prior performed action;

instructing a new seventh action for minimizing a relevant consequence of the prior performed action;

enabling/creating an interaction of a coordinated function instance and another function; and enabling a supreme control of the coordinated function instance by a human operator.

According to a second aspect of the invention, there is provided a method, comprising determining a range of an attribute of an anomaly; checking if the range of the attribute of the anomaly overlaps with a range of a related attribute of a coordinated function instance; triggering to execute a coordination action on the coordinated function instance if the range of the attribute of the anomaly overlaps with the range of the related attribute of the coordinated function instance, wherein the related attribute of the coordinated function instance is the same as the attribute of the anomaly, or the related attribute of the coordinated function instance and the attribute of the anomaly correspond to each other as input attribute and output attribute, respectively, or the related attribute of the coordinated function instance and the attribute of the anomaly correspond to each other as output attribute and input attribute, respectively.

The method may further comprise inhibiting the triggering to execute of the coordination action on the coordinated function instance if the range of the attribute of the anomaly does not overlap with the range of the related attribute of the coordinated function instance.

If the attribute of the anomaly is one of an input scope of the anomaly and an impact area of the anomaly, the related attribute may be one of an input scope of the coordinated function instance and an impact area of the coordinated function instance; and if the attribute of the anomaly is one of an input impact time of the anomaly and an output impact time of the anomaly, the related attribute may be one of an input impact time of the coordinated function instance and an output impact time of the coordinated function instance.

The method may further comprise creating an anomaly function instance based on the attribute of the anomaly; wherein the checking and the triggering is performed by coordinating the coordinated function instance and the anomaly function instance by a coordination function.

The method may further comprise monitoring if a resolution message is received, wherein the resolution message indicates that the anomaly is successfully troubleshooted; deleting the anomaly function instance if the resolution message is received.

The coordination action may comprise at least one of approving a first action requested by the coordinated function instance, rejecting a second action requested by the coordinated function instance, rescheduling a third action requested by the coordinated function instance, modifying a fourth action requested by the coordinated function instance, enabling/creating an interaction of the coordinated function instance and another function, instructing a new fifth action, and enabling a supreme control of the coordinated function instance by a human operator.

The method may further comprise determining if the range of the attribute of a prior performed action of a function instance overlaps with the range of the attribute of the anomaly function instance, wherein the coordination action may comprise at least one of instructing a new sixth action for undoing the prior performed action;

instructing a new seventh action for minimizing a relevant consequence of the prior performed action;

enabling/creating an interaction of a coordinated function instance and another function; and enabling a supreme control of the coordinated function instance by a human operator.

The method may be a method of SON coordination.

According to a third aspect of the invention, there is provided a computer program product comprising a set of instructions which, when executed on an apparatus, is configured to cause the apparatus to carry out the method according to the second aspect. The computer program product may be embodied as a computer readable medium or directly loadable into a computer.

According to some embodiments of the invention, at least one of the following advantages may be achieved:

Network may be protected from anomalies occurring at certain functions;

The framework of SON coordination function may be used; no need for an additional framework;

Human intervention may not be required if an anomaly occurs.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

The conventional SON coordination solution (built based on references [1] to [6], and substantially outlined in the present prior art section) does not know how to coordinate the network properly when there are anomaly instances occurring in some parts of the networks during network operation. For example, the SON coordination solution does not know where and what SON/other function instances should be prevented from taking actions, when there occurs an anomaly instance in the network. As another example, the SON coordination function does not know whether or not certain formerly taken actions by some SON/other functions should be rolled back following an occurred anomaly instance, if the anomaly instance is not caused by the taken actions. In such situation, the specific KPIs chosen for verification whether or not a SON action was successful may not indicate any significant degradation. Especially, in case those KPIs may not have been selected in the pre-defined anomaly detection rules, there may not be a correlation between the verification and the anomaly indication either.

A reason for such missing correlation may be that verification or SON verification is typically very limited in its scope. It verifies only the performance or result of a taken action of a normal SON function instance. In this case, as the verification function knows what SON function has taken that action, the verification function thus knows the (most) relevant KPIs for the action of the SON function (e.g. call drop rate, handover success rate, call setup success rate etc.). Verification can thus be made based on them. However, impacts on other KPIs, which might be (directly or indirectly) affected by the action of the SON function are typically not considered in verification. There are more examples that are not mentioned here.

In brief, the conventional SON coordination solution does not know how to identify all those function instances or their actions that would become improper or even erroneous when a specific anomaly instance occurs somewhere in a network/OSS during operation. Some embodiments of the invention solve this problem.

Some embodiments of the invention provide a method and/or and interface to automatically identify and coordinate any SON function instance and/or other function instance and/or its action that would become improper due to the occurrence of an anomaly (i.e. if a SON function instance and/or another function instance has an anomaly, as described at greater detail further below). The respective SON function instance and/or other function instance is also referred to as "anomaly instance".

Figure 1:
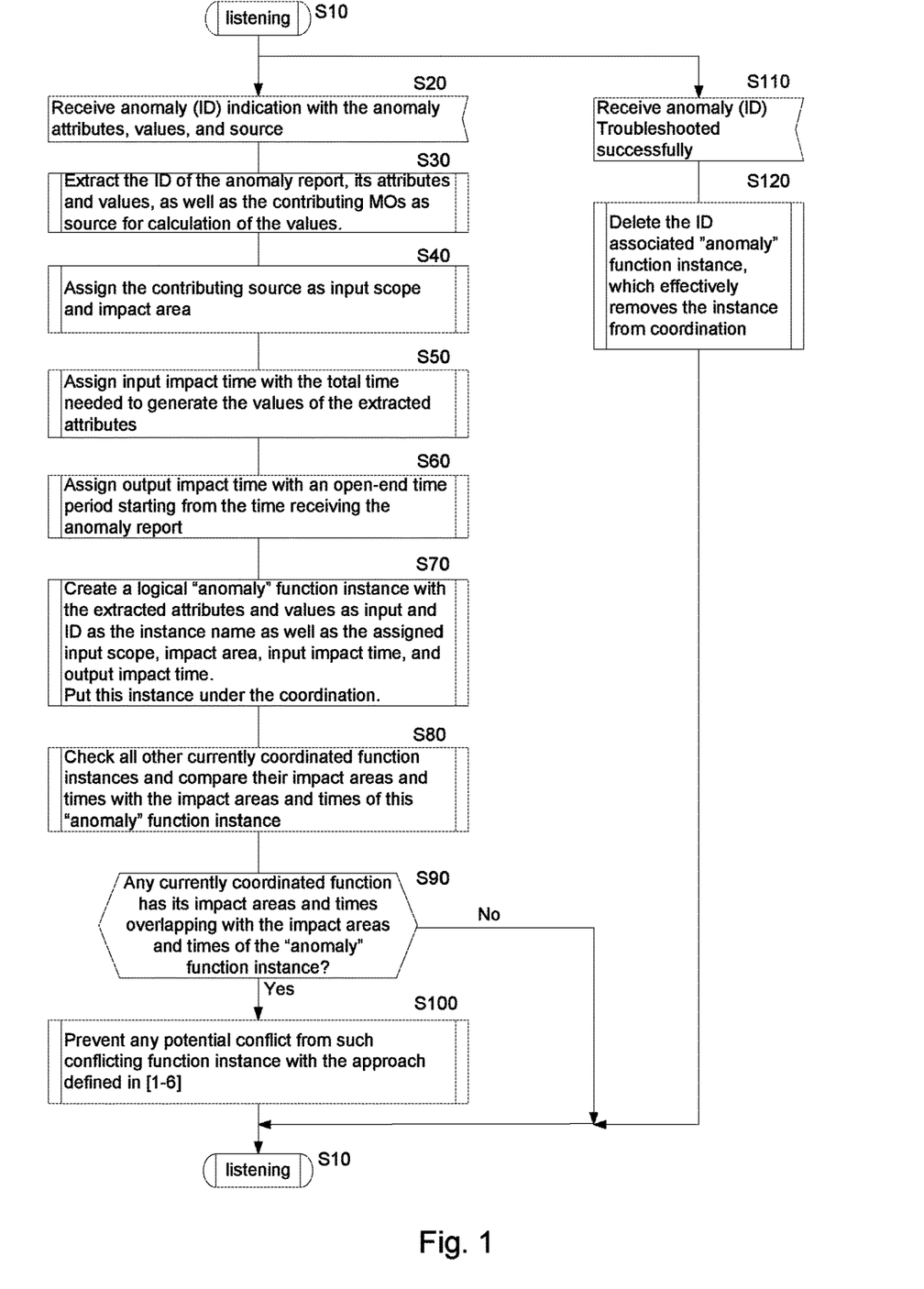
FIG. 1 shows a SDL-based flowchart of a method according to some embodiments of the invention.

FIG. 1 is an SDL diagram that describes a method according to some embodiments of the invention. The method may be performed by a SON coordination function (SCF) such as an extended SCF.

As shown in FIG. 1, the SCF listens to the messages indicating an occurrence of an anomaly or resolving of an anomaly (S10). When receiving an anomaly indication (S20), the SCF automatically models the occurred anomaly instance into an "anomaly" function instance (S30 to S70), which can be coordinated like any SON/other function instance (S80 to S100).

In detail, the SCF automatically extracts an anomaly ID from the anomaly indication in order to unambiguously define the specific anomaly (S30). The anomaly indication may additionally comprise attributes and their values of the anomaly instance. The attributes may be at least one of an input impact time, an input scope, information elements of the input scope, an objective, an output impact time, an impact area, and information elements of the impact area, as defined hereinabove in the prior art section. If the anomaly indication comprises the attributes and their values, they are extracted from the anomaly indication (S30).

Alternatively, the anomaly indication may comprise an identification of the anomaly instance, and the SCF may extract the attributes and their values from the data repository of the anomaly instance (i.e. from the data repository of the function having the anomaly). If the anomaly indication comprises attributes without values, SCF may retrieve only the values of these attributes from the data repository of the anomaly instance.

Based on the retrieved attributes and values, SCF constructs an "anomaly" function instance. The attributes and their values of the anomaly function instance are derived from the extracted attributes and their values (S40 to S70). The details of S40, S50, S60, and S70 are described further below. The sequence of S40, S50, and S60 is arbitrary. Some or all of these actions may be performed in parallel.

SCF coordinates the constructed "anomaly" function instance in the same way as all other SON functions and other functions under its jurisdiction, as described hereinabove in the prior art section and in [1] to [6] (S80 to S100). Thus, SCF automatically determines if there is any (SON) function instance or its action that would have a potential conflict with the "anomaly" function instance (i.e., with the anomaly instance). Such a conflict is identified e.g. when there is an overlap between the impact areas/times of the "anomaly" function instance and the impact areas/times of a SON/other function instance under coordination (S80, S90). As example options, a potential conflict may be assumed in case of one of the following overlaps or a predefined logical combination thereof:

overlap of an input impact time of a (SON) function instance with the input impact time of the anomaly function instance;

overlap of an input scope of a (SON) function instance with the input scope of the anomaly function instance;

overlap of an output impact time of a (SON) function instance with the input impact time of the anomaly function instance;

overlap of an input impact time of a (SON) function instance with the output impact time of the anomaly function instance;

overlap of an impact area of a (SON) function instance with the input scope of the anomaly function instance;

overlap of an input scope of a (SON) function instance with the impact area of the anomaly function instance;

overlap of an output impact time of a (SON) function instance with the output impact time of the anomaly function instance; and overlap of an impact area of a (SON) function instance with the impact area of the anomaly function instance.

If "yes" in S90 (i.e. in case of an overlap or a logical combination of overlaps), a suitable coordination action will be taken (S100). More particular, in some embodiments, SCF only triggers the coordination action, which is performed by a corresponding function such as a SON function.

The coordination action is predefined for each combination of an anomaly instance and a (SON) function. It comprises at least one of
- approving an action requested by the overlapping (SON) function instance,
- rejecting an action requested by the overlapping (SON) function instance,
- rescheduling an action requested by the overlapping (SON) function instance,
- modifying an action requested by the overlapping (SON) function instance,
- enabling/creating an interaction of the overlapping (SON) function instance. For example, the function may abandon the then collected attribute values as its input and request the recollection of them now or later. As another example, the input scope of the (SON) function may be redefined to prevent the overlapping with that of the anomaly instance.
- instructing a new action, and
- enabling the supreme control of the SON system (or of the overlapping (SON) function instance) by its human operator.

If "no" in S90 (i.e., no overlap or the predefined logical combination of overlaps is not TRUE), no further action is done by SCF. Instead, SCF listens again (S10).

In this way, the conventional SON coordination function is extended to have the capability to coordinate correctly the (SON) functions of the network/OSS when they are operating under the occurrences of anomaly instances.

After the coordination action has been triggered (S100), SCF listens again for messages indicating an occurrence of an anomaly or resolving of an anomaly (S10). In particular, if SCF receives an indication that the anomaly instance is successfully troubleshooted (i.e., the anomaly is removed) (S120), SCF deletes the corresponding anomaly function instance (S130; based on the anomaly ID which is comprised in both the anomaly indication and the indication of successful troubleshooting). For example, the indication may have a form of: Indication (ReportID, "AnomalyTroubleshooted"), where ReportId is the same as anomaly ID. After that, SCF listens again (S10).

Some benefits of a coordination solution also using the information of anomaly occurrence according to some embodiments of the invention are as follows: In the case of a prior performed action of a function, there are two situations. In one situation, the prior performed action is not a cause of the anomaly instance which occurs later than the prior performed action. Here, the occurred anomaly instance might impact the expected effect of the prior performed action. For example, a cell is switched off by an EMS function instance (which is a particular SON function instance) and its neighboring cell(s)/overlapping cell layer is compensating for the energy saving. If an anomaly instance occurs in the neighboring cell(s)/overlapping cell layer later, the coordination function should instruct to switch on the cell under energy saving. This may be done automatically by a SCF according to some embodiments of the invention, wherein OutputImpactTime of the anomaly function instance is set not later than now and the OutputImpactTime of the EMS function instance is set to the time from switching off the cell under energy saving to open end, the ImpactAreas of both the anomaly function instance and the EMS function instance comprise at least the cell under energy saving, and the predefined coordination action is rolling back the switching off of the cell under energy saving.

In another situation, the prior performed action is a cause of the anomaly which occurred later, i.e. after the action was performed. The prior performed action may be caused by e.g.
- a non-SON function instance but approved by SON coordination function;
- a non-SON function instance (e.g. in case of distributed-SON) that is not directly under the coordination of SON coordination function under consideration. That function instance may have taken that action directly; or
- a SON coordination function instance.

The coordination function may instruct to undo the prior performed action, i.e. this may be the predefined coordination action. Other potential coordination actions in the case of a prior performed action may be e.g. instructing a new action for minimizing a relevant consequence of the prior performed action; enabling/creating an interaction of the coordinated function instance and another function; and enabling a supreme control of the coordinated function instance by a human operator.

If the prior performed action is of an uncoordinated function instance (e.g., a distributed SON function instance), SON coordination function may act as follows:

1. the uncoordinated function instance takes an action (i.e. the "prior performed action") to the network itself without the decision of the SON coordination function.

2. This taken action is recorded in the CM database of OSS (any CM operations will be recorded there).

3. SON coordination function is informed on the recording in the CM database.

4. SON coordination function extracts the impact area and output impact time of this taken action, according to the metadata describing that function. Then, SON coordination function remembers the information of the action and its impact area and time.

5. SON coordination function uses this info when it coordinates the function instance under its coordination. For example, if the (intended) action of a function instance under its coordination would conflict with the prior performed action of the uncoordinated function instance, SON coordination function takes coordination action accordingly, as outlined hereinabove. For example, predefined rules may decide on the priority of the prior performed action and the intended action. The rules may be generally predefined (e.g. "the prior performed action always has (or: does not have) priority over the intended action; or they may be specific e.g. depending on the action(s), the function instance(s); and the overlapping attribute range(s). Similar rules may apply if the prior performed action was an action of a coordinated function instance.

Concerning a function instance (e.g., a CCO instance which is another particular SON function instance), the coordination function should instruct this CCO instance to stop optimizing the cells in the impact areas of an anomaly instance, given their impact times are overlapping as well. This may be achieved by preventing the CCO instance to take any action after the occurrence of an anomaly instance, if their impact areas and impact times are overlapping. The coordination function may even instruct to deactivate a certain function/instance if it is mostly impacting with the anomaly instance.

For multivendor capability, a "standard" interface (e.g., itf-N or that of OSSii) is needed for SON coordination function to receive the anomaly indication and its related information (e.g., the attributes and the IDs of the MOs contributed to the generation of the attribute values, etc.) from the anomaly detection entity or any other related entity. The example information elements of the anomaly indication are described below. For multivendor capability, a "standard" interface (e.g., itf-N or that of OSSii) is also required for SON coordination function to receive the notification on the successful troubleshooting of an indicated anomaly instance identifiable with its ID, so that the SON coordination function can delete the corresponding "anomaly" function instance from its coordination. The example information elements for this indication are also defined further below. Worth mentioning, for multivendor capability, a "standard" interface (e.g., itf-N or that of OSSii) is also needed for SON coordination function to coordinate the SON/other function instances and their taken actions.

Example attributes and function of an anomaly instance

An anomaly instance is reported by an anomaly detector (e.g., Nokia's products, such as SPLM, NetAct Advanced Monitor, or AOR). The anomaly instance is detected with a set of attributes such as status variables, counters, and/or KPIs, often plus a set of rules. The anomaly instance provides the following information, directly or indirectly, e.g. via the anomaly detector: the anomaly report ID and the time to receive this anomaly report. The anomaly instance also provides the following information, directly or indirectly: the detection rule(s) and value(s) if the anomaly detection is based on pre-defined rule(s) or, if detected by a non-rule-based function such as a profiling function, a pre-defined set of parameter(s) and their then value(s) used by the anomaly detection function to detect the anomaly instance.

Assume these anomaly attributes are variables represented as a1, a2, a3, . . . , and an. Therefore, an anomaly instance is a function of the attributes, which can be represented as anomalyi (a1, a2, a3, . . . , an), where the output of the anomaly function is either "yes" or "no" and, "anomalyj" is the unique ID of this anomaly (function).

For example of anomaly rule-based detection, Table 1 defines when anomalyi outputs "yes" (i.e., anomalyi is detected). Otherwise, it outputs "no".

TABLE 1

Example of a rule-based anomaly detection by anomalyj function.

| anomalyi | a1 | a2 | a3 | a4 | a5 |
|---|---|---|---|---|---|
| "yes" | < v1 | ≥v2 | false | [v41, v42] | NULL |

In an example of anomaly detection based on profiling, anomalyi outputs "yes" (i.e., anomalyi is detected), when the profiling function output "yes". Here, the profiling function used the set of attributes (a1, a2, a3, . . . , an) to calculate the result "yes" or "no" output.

The anomaly function may correspond to a function instance directly or indirectly under jurisdiction of SCF, or it may be a function based on one or more network functions. For example, the anomaly function may correspond to a EMS function instance under jurisdiction of SCF. If a cell does not adapt its power for some reason although instructed so by the EMS function instance, the result of the anomaly function is "yes", otherwise it is "no". As another example, the anomaly function may be a function observing the number of handovers between two cells, which is not a function under jurisdiction of SCF. If the number of handovers exceeds a certain value, the anomaly function has the result "yes", otherwise, the result is "no".

If the result of the anomaly function is "yes", it provides the anomaly indication discussed with respect to FIG. 1 and provides the attributes and values, as discussed.

Example entities, interfaces, and message sequences to construct a specific "anomaly" function instance and coordinate it.

Figure 2:
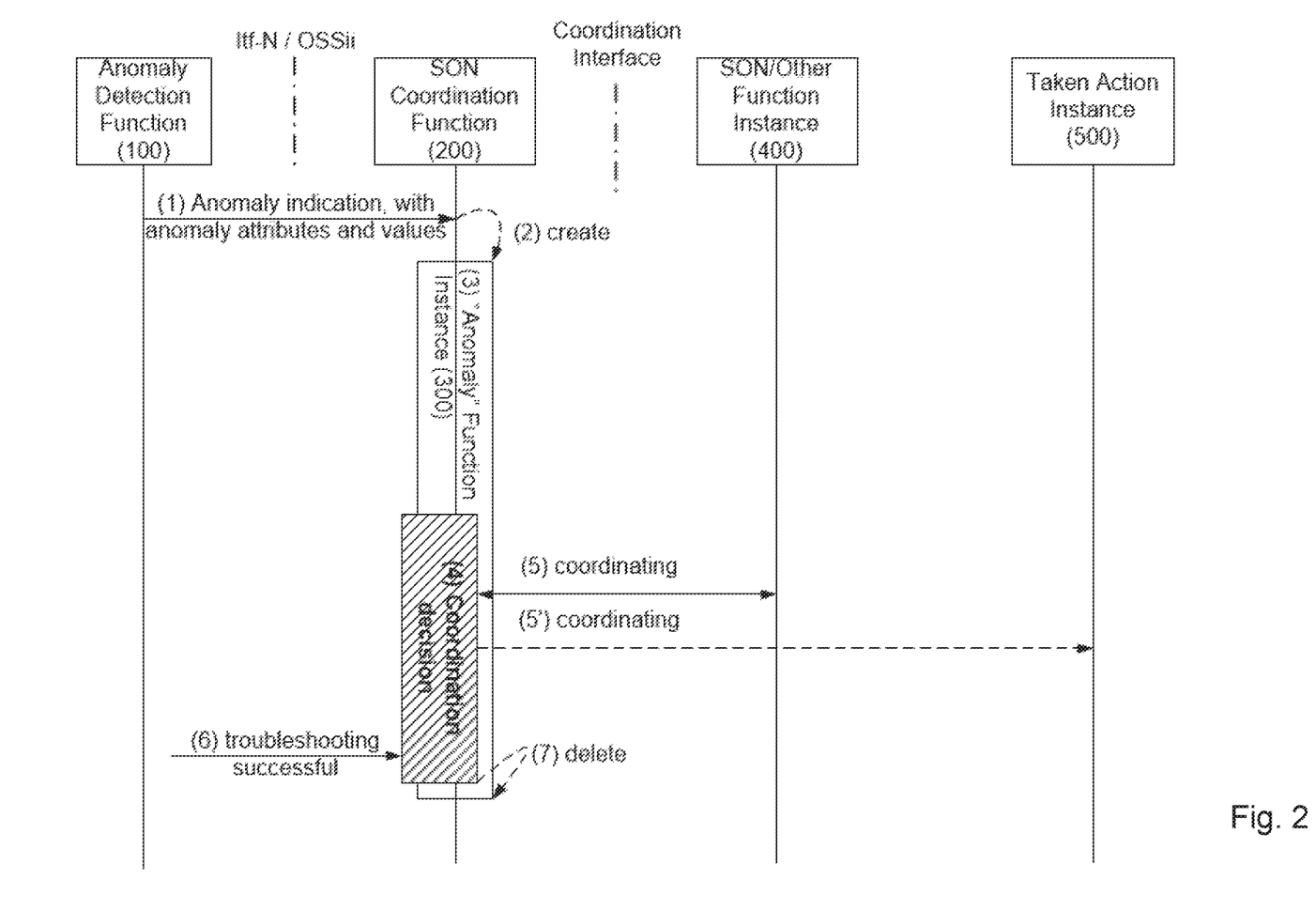
FIG. 2 shows a message flow according to some embodiments of the invention.

FIG. 2 shows an implementation example of entities, interfaces, and message sequences for a SON coordination function to define a specific "anomaly" function instance and coordinate it accordingly and automatically. It works as follows:

An anomaly detection function 100 indicates an anomaly occurrence to SON coordination function 200, with Message (1), directly or indirectly. The SON coordination function extracts the needed information from Message (1) and creates a logical anomaly function instance "Instance (3)" under its coordination, via Action (2). The coordination function makes decision(s) "Coordination Decision (4)". If the anomaly function instance impacts another function under jurisdiction of the SCF (if there is an overlap as discussed hereinabove), it triggers or performs a coordination related function and/or action instances via Message (5) to some (SON) function instance 400 and/or via Message (5') to a Taken Action Instance 500 which is not under jurisdiction of the SCF. When the SON coordination function receives an indication that the anomaly instance has been troubleshooted successfully, via Message (6), the coordination function removes this "anomaly" function instance from the coordination, via Action (7).

Example data structure and interface message to construct a specific "anomaly" function instance automatically As shown in Step (1) of FIG. 2, the Anomaly Detection Function (which may be a logical entity) detects an anomaly occurred somewhere in a network/OSS. The Anomaly Detection Function (or any other entity) reports the occurred anomaly instance to the SON Coordination Function (which may be a logical entity, too), e.g., with message:

Indication (AnomalyDescription, ReportID, 1..*(AnomalyAttribute, <Value>, <Relation>, Source))

Therein:
AnomalyDescription=a string that describe the reported anomaly
ReportID=a unique sequence number of this indication
AnomalyAttribute=a string defining the name of the attribute
Value=value of AnomalyAttribute
Relation=relation between AnomalyAttribute and Value, where relation ε {<, ≤, =, >, ≥, #}
For example, a=0.5 or b<−90.
Source=1..*(MOID), from where Value of AnomalyAttribute is calculated.
MOID=identity of a managed object
"1..*" means one or more of the following.
SON coordination function creates a corresponding "anomaly" function instance for the reported anomaly accordingly as follows (S70 in FIG. 1):
Anomaly Function Instance AnomalyFunctionInstance=Instance(ReportID,Input,
  InputScope,InputImpactTime,Output,Impact-
  Area,OutputImpactTime)

Therein:
Input=1..*(AnomalyAttribute(<Value>, <Relation>))
InputScope=U Source

InputImpactTime=the total time needed to calculate the attribute values, which leads to the anomaly detection
Output=AnomalyDescription
ImpactArea=U Source
OutputImpactTime=[timeOfAnomalyReport, openEnded|timeOfTroubleshooted]

U means "joint of". InputScope and InputImpactTime may also be referred to as input attributes, ImpactArea and OutputImpactTime may also be referred to as output attributes. Therein, InputScope corresponds to ImpactArea, and InputImpactTime corresponds to OutputImpactTime.

The OutputImpactTime is from the timeOfAnomalyReport to the timeOfTroubleshooted when the anomaly is successfully troubleshooted, and open ended as long as the anomaly persists (S60 in FIG. 1).

The InputImpactTime may be calculated from information available in the MOs of Source or from some other database. (S50 in FIG. 1). E.g., if an anomaly is detected based on performance counters which are collected every 15 minutes, the InputImpactTime is 15 min before the timeOfAnomalyReport, when the anomaly is reported. The value of 15 minutes may be stored in the instance collecting the performance data and/or in the MO itself, and/or in a data repository of a corresponding SON function, and/or in a data repository of the SCF.

Note: The InputScope and ImpactArea have the same set of MOIDs in this case. It is because the anomaly instance is detected according to the input from the InputScope. It also means that the occurrence of the anomaly instance has impacted the attributes in the InputScope, otherwise there will be no such anomaly instance detected. Therefore, the ImpactArea of the anomaly instance has the same set of MOIDs as the InputScope of the anomaly instance. Nevertheless, in order to model the anomaly function instance in the same way as any other (SON) function under the jurisdiction of SCF, both attributes ImpactArea and InputScope are used (S40 in FIG. 1).

Figure 3:
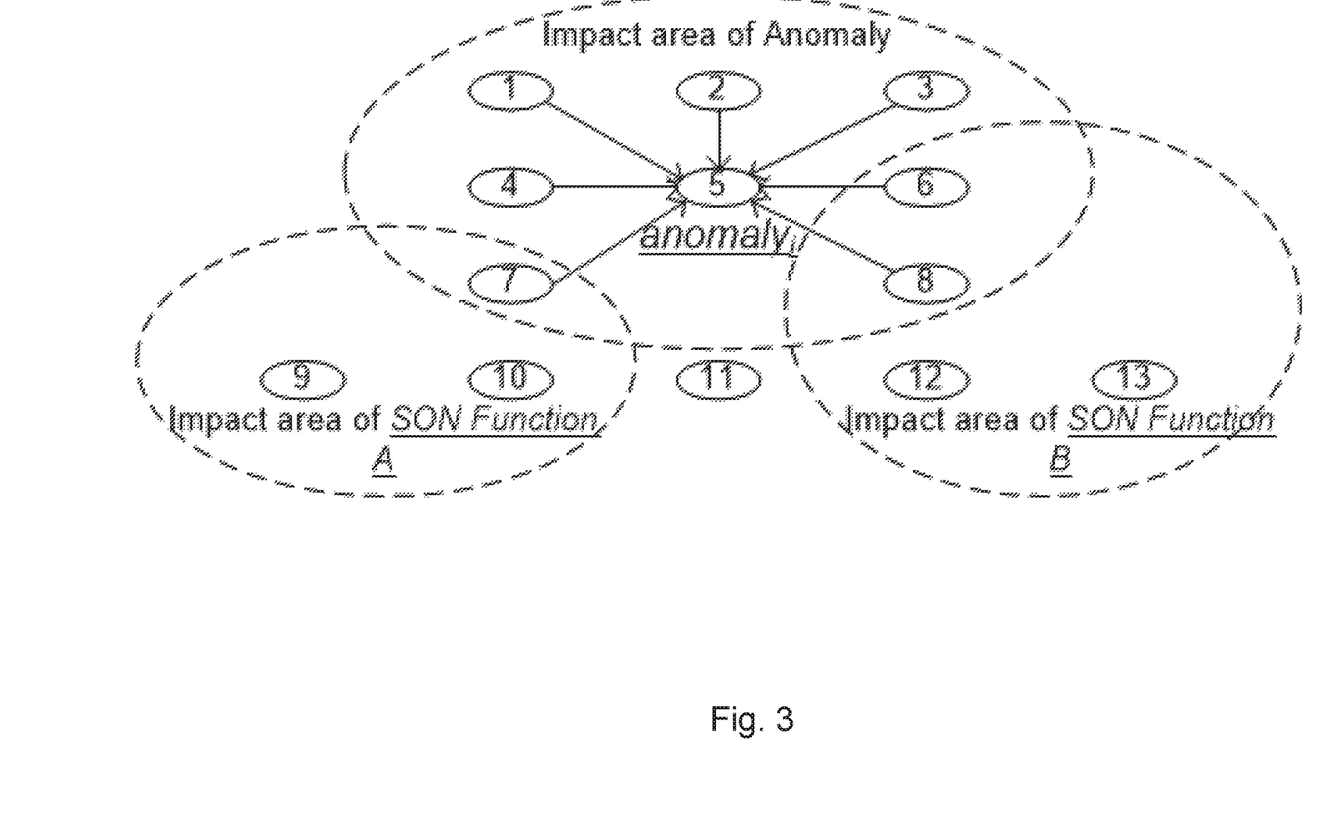
FIG. 3 shows a network of cells for illustrating Input-Scope and ImpactArea.

FIG. 3 exemplifies that ImpactArea and InputScope are the same for an anomaly function instance (in general, for other function instances, they may be different from each other).

In the example of FIG. 3, an anomaly has been detected in cell 5. However, at this point it is not known if the anomaly has been caused directly by the cell 5 itself or by one of its neighboring cells. Thus, the InputScope includes the cells inside the circle line including cells 1 to 8 as they all may have caused impacts to the performance metrics that are monitored by the anomaly detection rules in cell 5. The ImpactArea is the same, because the anomaly in cell 5 may affect the surrounding cells in return (e.g. they may have to compensate cell 5 by taking over more traffic or they may face some degradation in performance).

With respect to SON functions, the InputSope and ImpactArea may be typically different. For example, the InputScope of SON Function B is cell 13 only (e.g. performance has dropped below some threshold, which has triggered some SON function in cell 13). The execution of the SON Function B in cell 13 can however impact the neighboring cells (6, 8, 12) (e.g. if causing changes to antenna tilt or adjacency/handover parameter settings). Thus, with SON functions, the ImpactArea may be different (typically bigger) than the InputScope.

Figure 4:
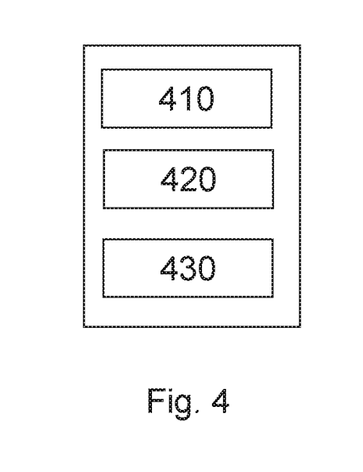
FIG. 4 shows an apparatus according to an embodiment of the invention.
Figure 5:
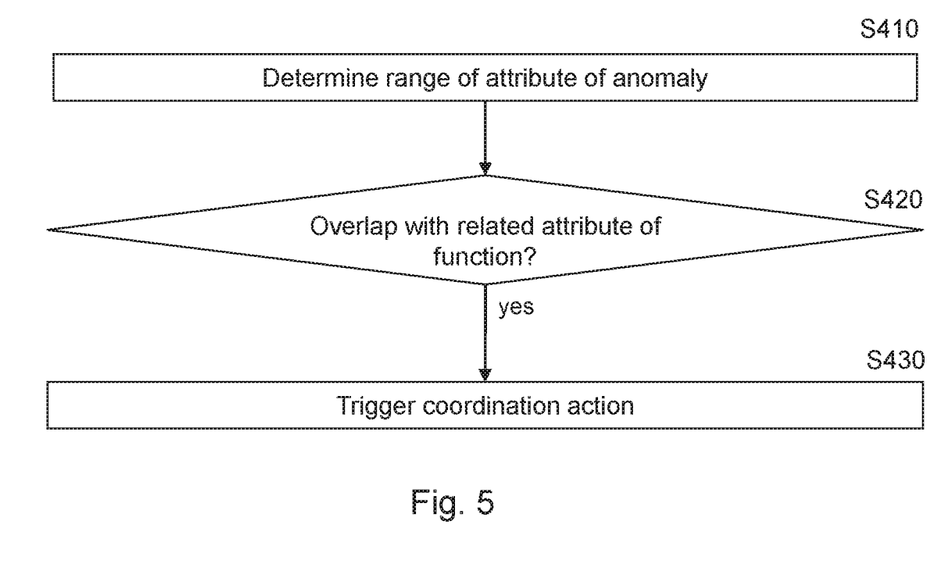
FIG. 5 shows a method according to an embodiment of the invention.

FIG. 4 shows an apparatus according to an embodiment of the invention. The apparatus may be a SCF or an element thereof. FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises determining means 410, checking means 420, and triggering means 430. The determining means 410, checking means 420, and triggering means 430 may be a determining processor, checking processor, and triggering processor, respectively.

The determining means 410 determines a range of an attribute of an anomaly (S410). The attribute may be an input attribute such as an input scope or an input impact time, or it may be an output attribute such as an impact area or an output impact time.

The checking means 420 checks if the range of the attribute of the anomaly overlaps with a range of a related attribute of a coordinated function instance (S420). The related attribute of the coordinated function instance may be the same as the attribute of the anomaly, or the related attribute of the coordinated function instance and the attribute of the anomaly correspond to each other as input attribute and output attribute, respectively, or the related attribute of the coordinated function instance and the attribute of the anomaly correspond to each other as output attribute and input attribute, respectively. For example, input scope and impact area correspond to each other as input attribute and output attribute, and input impact time and output impact time correspond to each other as input attribute and output attribute.

If the range of the attribute of the anomaly overlaps with the range of the related attribute of the coordinated function instance (S420="yes"), the triggering means 430 triggers to execute a coordination action on the coordinated function instance (S430).

Figure 6:
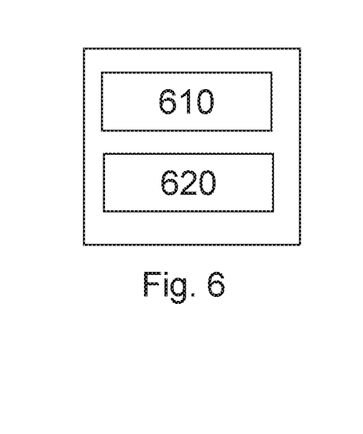
FIG. 6 shows an apparatus according to an embodiment of the invention.

FIG. 6 shows an apparatus according to an embodiment of the invention. The apparatus comprises at least one processor 610, at least one memory 620 including computer program code, and the at least one processor 610, with the at least one memory 620 and the computer program code, being arranged to cause the apparatus to at least perform at least the method according to FIG. 5.

The term "(SON) function" means "a SON function and/or a function which is not a SON function (a "non-SON Function")". Names of variables (e.g. "InputImpactTime") described for the data model correspond to the names of the variables in the functional description (in this case: "input impact time").

Embodiments of the invention are described where the anomaly function instance with its attributes is coordinated in a SON coordination function framework extended over the prior art. This implementation is particularly useful if the conventional SON coordination function is already present because all advantages of it may be exploited for the case of an anomaly, too.

In some embodiments, an anomaly function instance may not be created but the ranges of the attributes are stored without reference to an anomaly function instance. When checking for an overlap, each stored range is compared with the range of a respective related attribute of another (SON) functions. In such an embodiment, a SON coordination function is not necessarily needed, but at least part of corresponding functions has to be set up.

Embodiments of the invention may be employed in a 3GPP network such as LTE or LTE-A, or in a 5G network. They may be employed also in other communication networks such as CDMA, EDGE, UTRAN networks, etc. including wireline networks.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a coordination function such as a SON coordination function, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. They may be implemented fully or partly in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising at least one processor, at least one memory including computer program code, and the at least one processor, with the at least one memory and the computer program code, being arranged to cause the apparatus to at least perform at least:
determining a range of an attribute of an anomaly;
checking if the range of the attribute of the anomaly overlaps with a range of a related attribute of a coordinated function instance;
triggering execution of a coordination action on the coordinated function instance if the range of the attribute of the anomaly overlaps with the range of the related attribute of the coordinated function instance; and
inhibiting the triggering of execution of the coordination action on the coordinated function instance if the range of the attribute of the anomaly does not overlap with the range of the related attribute of the coordinated function instance; wherein:
the related attribute of the coordinated function instance is the same as the attribute of the anomaly, or
the related attribute of the coordinated function instance and the attribute of the anomaly correspond to each other as input attribute and output attribute, respectively, or
the related attribute of the coordinated function instance and the attribute of the anomaly correspond to each other as output attribute and input attribute, respectively.

2. The apparatus according to claim 1, wherein:
if the attribute of the anomaly is one of an input scope of the anomaly and an impact area of the anomaly, the related attribute is one of an input scope of the coordinated function instance and an impact area of the coordinated function instance; and
if the attribute of the anomaly is one of an input impact time of the anomaly and an output impact time of the anomaly, the related attribute is one of an input impact time of the coordinated function instance and an output impact time of the coordinated function instance.

3. The apparatus according to claim 1, wherein the at least one memory and the computer program code are arranged to cause the apparatus to further perform:
creating an anomaly function instance based on the attribute of the anomaly, wherein the checking and the triggering is performed by coordinating the coordinated function instance and the anomaly function instance by a coordination function.

4. The apparatus according to claim 3, wherein the at least one memory and the computer program code are arranged to cause the apparatus to further perform:
monitoring if a resolution message is received, wherein the resolution message indicates successful troubleshooting of the anomaly; and
deleting the anomaly function instance if the resolution message is received.

5. The apparatus according to claim 1, wherein the coordination action comprises at least one of:
approving a first action requested by the coordinated function instance;
rejecting a second action requested by the coordinated function instance;
rescheduling a third action requested by the coordinated function instance;
modifying a fourth action requested by the coordinated function instance;
enabling/creating an interaction of the coordinated function instance and another function;
instructing a new fifth action; and
enabling a supreme control of the coordinated function instance by a human operator.

6. The apparatus according to claim 1, wherein the at least one memory and the computer program code are arranged to cause the apparatus to further perform:
determining if the range of the attribute of a prior performed action of a function instance overlaps with the range of the attribute of the anomaly function instance, wherein the coordination action comprises at least one of:
instructing a new sixth action for undoing the prior performed action;
instructing a new seventh action for minimizing a relevant consequence of the prior performed action;
enabling/creating an interaction of a coordinated function instance and another function; and
enabling a supreme control of the coordinated function instance by a human operator.

7. A method, comprising:
determining a range of an attribute of an anomaly;

checking if the range of the attribute of the anomaly overlaps with a range of a related attribute of a coordinated function instance;

triggering execution of a coordination action on the coordinated function instance if the range of the attribute of the anomaly overlaps with the range of the related attribute of the coordinated function instance; and inhibiting the triggering of execution of the coordination action on the coordinated function instance if the range of the attribute of the anomaly does not overlap with the range of the related attribute of the coordinated function instance; wherein:

the related attribute of the coordinated function instance is the same as the attribute of the anomaly, or the related attribute of the coordinated function instance and the attribute of the anomaly correspond to each other as input attribute and output attribute, respectively, or the related attribute of the coordinated function instance and the attribute of the anomaly correspond to each other as output attribute and input attribute, respectively.

8. The method according claim 7, wherein:

if the attribute of the anomaly is one of an input scope of the anomaly and an impact area of the anomaly, the related attribute is one of an input scope of the coordinated function instance and an impact area of the coordinated function instance; and if the attribute of the anomaly is one of an input impact time of the anomaly and an output impact time of the anomaly, the related attribute is one of an input impact time of the coordinated function instance and an output impact time of the coordinated function instance.

9. The method according to claim 7, further comprising:

creating an anomaly function instance based on the attribute of the anomaly, wherein the checking and the triggering is performed by coordinating the coordinated function instance and the anomaly function instance by a coordination function.

10. The method according to claim 9, further comprising:

monitoring if a resolution message is received, wherein the resolution message indicates successful troubleshooting of the anomaly; and deleting the anomaly function instance if the resolution message is received.

11. The method according to claim 7, wherein the coordination action comprises at least one of:

approving a first action requested by the coordinated function instance;

rejecting a second action requested by the coordinated function instance;

rescheduling a third action requested by the coordinated function instance;

modifying a fourth action requested by the coordinated function instance;

enabling/creating an interaction of the coordinated function instance and another function;

instructing a new fifth action; and enabling a supreme control of the coordinated function instance by a human operator.

12. The method according to claim 7, further comprising:

determining if the range of the attribute of a prior performed action of a function instance overlaps with the range of the attribute of the anomaly function instance, wherein the coordination action comprises at least one of:

instructing a new sixth action for undoing the prior performed action;

instructing a new seventh action for minimizing a relevant consequence of the prior performed action;

enabling/creating an interaction of a coordinated function instance and another function; and enabling a supreme control of the coordinated function instance by a human operator.

13. A non-transitory computer readable medium embodying a set of executable instructions, the set of executable instructions configured to manipulate at least one processor to:

determine a range of an attribute of an anomaly;

check if the range of the attribute of the anomaly overlaps with a range of a related attribute of a coordinated function instance;

trigger execution of a coordination action on the coordinated function instance if the range of the attribute of the anomaly overlaps with the range of the related attribute of the coordinated function instance; and inhibit the triggering of execution of the coordination action on the coordinated function instance if the range of the attribute of the anomaly does not overlap with the range of the related attribute of the coordinated function instance; wherein:

the related attribute of the coordinated function instance is the same as the attribute of the anomaly, or the related attribute of the coordinated function instance and the attribute of the anomaly correspond to each other as input attribute and output attribute, respectively, or the related attribute of the coordinated function instance and the attribute of the anomaly correspond to each other as output attribute and input attribute, respectively.

14. The non-transitory computer readable medium of claim 13, wherein:

if the attribute of the anomaly is one of an input scope of the anomaly and an impact area of the anomaly, the related attribute is one of an input scope of the coordinated function instance and an impact area of the coordinated function instance; and if the attribute of the anomaly is one of an input impact time of the anomaly and an output impact time of the anomaly, the related attribute is one of an input impact time of the coordinated function instance and an output impact time of the coordinated function instance.

15. The non-transitory computer readable medium of claim 13, the set of executable instructions configured to manipulate at least one processor to:

create an anomaly function instance based on the attribute of the anomaly, wherein the checking and the triggering is performed by coordinating the coordinated function instance and the anomaly function instance by a coordination function.

16. The non-transitory computer readable medium of claim 15, the set of executable instructions configured to manipulate at least one processor to:

monitor if a resolution message is received, wherein the resolution message indicates successful troubleshooting of the anomaly; and delete the anomaly function instance if the resolution message is received.

17. The non-transitory computer readable medium of claim 13, wherein the coordination action comprises at least one of:

approving a first action requested by the coordinated function instance;
rejecting a second action requested by the coordinated function instance;
rescheduling a third action requested by the coordinated function instance;
modifying a fourth action requested by the coordinated function instance;
enabling/creating an interaction of the coordinated function instance and another function;
instructing a new fifth action; and
enabling a supreme control of the coordinated function instance by a human operator.

\* \* \* \* \*